United States Patent
Prince (10) Patent No.: US 8,754,929 B1
(45) Date of Patent: Jun. 17, 2014

(54) REAL TIME VERGENCE CONTROL FOR 3D VIDEO CAPTURE AND DISPLAY

(76) Inventor: John Prince, Los Altos, CA (US)

( * ) Notice: Subject to any disclaimer, the term of this patent is extended or adjusted under 35 U.S.C. 154(b) by 201 days.

(21) Appl. No.: 13/068,885

(22) Filed: May 23, 2011

(51) Int. Cl.
H04N 13/00 (2006.01)

(52) U.S. Cl.
CPC ........ H04N 13/0022 (2013.01); *H04N 13/0029* (2013.01)
USPC .......................................................... 348/47

(58) Field of Classification Search
CPC .......... H04N 13/0022; H04N 13/0239; H04N 13/0296; H04N 13/0055
USPC ................... 348/47, 148; 382/284; 455/556.1
See application file for complete search history.

(56) References Cited

U.S. PATENT DOCUMENTS

| | | | | |
|---|---|---|---|---|
| 5,606,627 | A * | 2/1997 | Kuo ............................... | 382/154 |
| 5,839,440 | A * | 11/1998 | Liou et al. ..................... | 600/431 |
| 6,621,921 | B1 * | 9/2003 | Matsugu et al. ............... | 382/154 |
| 6,798,406 | B1 | 9/2004 | Jones et al. | |
| 6,798,701 | B2 * | 9/2004 | Yamazaki ................. | 365/189.05 |
| 6,862,364 | B1 * | 3/2005 | Berestov ...................... | 382/132 |
| 6,917,701 | B2 * | 7/2005 | Martins ........................ | 382/154 |
| 7,027,659 | B1 * | 4/2006 | Thomas ........................ | 382/254 |
| 7,092,003 | B1 * | 8/2006 | Siegel et al. .................... | 348/47 |
| 7,170,547 | B2 * | 1/2007 | Uchiyama et al. .............. | 348/49 |
| 7,440,004 | B2 * | 10/2008 | Siegel et al. .................... | 348/47 |
| 8,284,235 | B2 * | 10/2012 | Held et al. ...................... | 348/42 |
| 2003/0013523 | A1 * | 1/2003 | Tashiro et al. ................... | 463/32 |
| 2003/0018647 | A1 * | 1/2003 | Bialkowski .................... | 707/101 |
| 2003/0107655 | A1 * | 6/2003 | Ishizaka et al. ............. | 348/211.2 |
| 2005/0060620 | A1 * | 3/2005 | Hogan ........................ | 714/718 |
| 2006/0072020 | A1 * | 4/2006 | McCutchen ................ | 348/218.1 |
| 2006/0251330 | A1 * | 11/2006 | Toth et al. ...................... | 382/236 |
| 2009/0058987 | A1 * | 3/2009 | Thielman et al. ........... | 348/14.08 |
| 2010/0007719 | A1 * | 1/2010 | Frey et al. ........................ | 348/46 |
| 2010/0014780 | A1 * | 1/2010 | Kalayeh ........................ | 382/284 |
| 2010/0296752 | A1 * | 11/2010 | Pataky et al. .................. | 382/276 |
| 2011/0012998 | A1 * | 1/2011 | Pan .................................. | 348/47 |
| 2011/0075020 | A1 * | 3/2011 | Veeraraghavan et al. ...... | 348/367 |
| 2011/0142311 | A1 * | 6/2011 | Felsberg ........................ | 382/131 |
| 2011/0143811 | A1 * | 6/2011 | Rodriguez ................. | 455/556.1 |
| 2011/0222757 | A1 * | 9/2011 | Yeatman et al. .............. | 382/154 |
| 2011/0248987 | A1 * | 10/2011 | Mitchell ........................ | 345/419 |

(Continued)

OTHER PUBLICATIONS

Chandrakanth, et. al., "Novel Architecture for Highly Hardware Efficient Implementation of Real Time Matrix Inversion Using Gauss Jordan Technique", ISVLSI, 2010.*

(Continued)

*Primary Examiner* — Y Lee
*Assistant Examiner* — Joseph Suh
(74) *Attorney, Agent, or Firm* — File-EE-Patents.com; Jay A. Chesavage (57) ABSTRACT

This invention relates to the recording and display three-dimensional (3D) images, notably in real-time video capture. This invention focuses on the ability to alter vergence instantaneously through software in order to amend disparities caused by differences between focal length and vergence distance. No mechanical means are necessary for amending both horizontal and vertical disparity. The ability to vary vergence allows selected images to be made to appear behind, level with, or in front of a display screen. While the invention is useful for consumer displays in television and films, the invention may also be used, for example, for visualizing weather, for mapping, for seismic surveys or for aircraft flight control. It is applicable, in real time, throughout the electromagnetic spectrum particularly in the visible, infra-red and microwave portions.

20 Claims, 6 Drawing Sheets

(56) References Cited

U.S. PATENT DOCUMENTS

| | | | |
|---|---|---|---|
| 2012/0026329 A1* | 2/2012 | Vorobiev | 348/148 |
| 2012/0119744 A1* | 5/2012 | Habashy et al. | 324/339 |
| 2012/0182397 A1* | 7/2012 | Heinzle et al. | 348/47 |
| 2012/0249746 A1* | 10/2012 | Cornog et al. | 348/47 |
| 2012/0249750 A1* | 10/2012 | Izzat et al. | 348/47 |
| 2012/0250152 A1* | 10/2012 | Larson et al. | 359/464 |
| 2013/0093855 A1* | 4/2013 | Kang et al. | 348/47 |
| 2013/0113891 A1* | 5/2013 | Mayhew et al. | 348/47 |

OTHER PUBLICATIONS

Zilly, et. al., "STAN—An Assistance System for 3D Productions," 2011 14th ITG Conference on Electronic Media Technology (CEMT), 2011, pp. 294-298.*

Kwon, "Vergence Control of Binocular Stereoscopic Camera Using Disparity Information", J Opt Soc of Korea, vol. 13 No. 3, Sep. 2009 pp. 379-385.

Canny, "A computational approach to edge detection", IEEE Trans Pat Anal and Mach Intel, PAMI-8 No. 6, Nov. 1986.

* cited by examiner

REAL TIME VERGENCE CONTROL FOR 3D VIDEO CAPTURE AND DISPLAY

BACKGROUND OF THE INVENTION

1. Field of the Invention

This invention relates to the recording and display of three-dimensional (3D) images, notably in real-time video capture. This invention focuses on the ability to alter vergence instantaneously through software in order to amend disparities caused by differences between focal length and vergence distance. The ability to vary vergence allows selected images to be made to appear behind, level with, or in front of a display screen. While the invention is useful for consumer displays in television and films, the invention may also be used, for example, for visualizing weather, for mapping, for seismic surveys or for aircraft flight control. It is applicable, in real time, throughout the electro-magnetic spectrum particularly in the visible, infra-red and microwave portions. It may also be used for sonar.

2. Description of the Related Art

Vergence is usually thought of as the distance from a pair or more of cameras to a viewed object on which their optic axes are made to coincide. In related art these cameras, like eyeballs, are linked together for the purpose of creating 3D images. In this analogy, most 3D cameras adjust vergence mechanically by rotating their axes from zero degrees (for objects at infinity) to a less acute angle when objects of interest are nearby.

In the related art there are many mechanical means by which the necessary vergence may be achieved. In one example, a system of prisms and beam splitters may be used to combine the light from two or more vergent streams onto a single camera (or lens), with light being chopped alternately to differentiate inputs from various orientations, such as left from right. The vergence angle here can only be changed mechanically by adjusting certain optical components In another example, the camera itself may be made to commutate between two or more adjacent positions, with the vergence angle being adjusted continuously to compensate for different viewpoints. However, this arrangement makes it hard to achieve the frame rate required for video.

Because of limitations like the foregoing what is sought here is a non-mechanical means of adjusting vergence which is quick, convenient, and (as an added benefit) can be applied anywhere in the data stream. Especially we seek a solution for allowing the viewer to adjust the vergence level in the display to the viewer's comfort level—in other words, to push back obtrusive content, or to pull objects of interest into prominence, if and when deemed desirable.

SUMMARY OF THE INVENTION

For a number of reasons, including comfort and emphasis, there is a need to control vergence in 3D photographs and videos. The present invention shows a means of controlling vergence both at the image capture end and at the viewing end of the image stream, and at any point in between. The issue of comfort has come up with viewers, either singly or in theater audiences, and this invention shows a means to favorably alter what a viewing audience sees, either on a personal screen or at a movie theater. This can be achieved in our present invention in real time, with no moving parts, in software.

There are major causes of audience viewing headaches. One is the disparity between the eyes' focal point, which naturally falls on the screen, and the vergence point, which may lie too far behind or in front of the screen. The vergence point is a psychological barrier since our eyes are designed by nature to focus and converge at the same point.

Another cause of viewer headaches may be the excessive horizontal distance between left and right projected images. While these may appear normal on small displays—say 0.5" apart on a home television screen—when images are projected onto a theater screen (which may be many times larger) they could easily exceed the distance between a normal pair of eyes (2.5"), forcing the viewer to try to see images wall-eyed. This too can be amended through software.

Another cause of viewer headaches may be vertical disparity. This has to do with camera pose or pitch. For multiple cameras their optic axes should all converge in the same plane. If one or more cameras is out of plane the effect is multiplied from small to large screens.

The situation becomes more complex when the number of cameras increases to (say) eight or nine, such as are required for filming 3D for display on glasses-free screens. (Some schemes require a hundred or more cameras.)

Our practice is enabled through the ability to reassign (or warp) apparent pixel positions on the detectors to other than their previous (nominal) positions, so that the image positions on the detectors, and the projected image position on the screen, are apparently sufficiently shifted (i) to move the vergence points closer to or further away from the cameras and (ii) to amend horizontal and vertical disparities.

The ability to control vergence and disparities means that viewing comfort can be increased to an acceptable level no matter (within limits) how the videos have been taken. As will be shown, this can be done in software and in virtually real-time during recording, transport and display.

DETAILED DESCRIPTION OF THE INVENTION

This invention (with further advantages noted below) may be best understood by reference to the following drawings, in which like reference numerals identify like elements, and in which: the to the following descriptions taken together with the accompanying several figures illustrate the substance of the invention.

Figure 1:
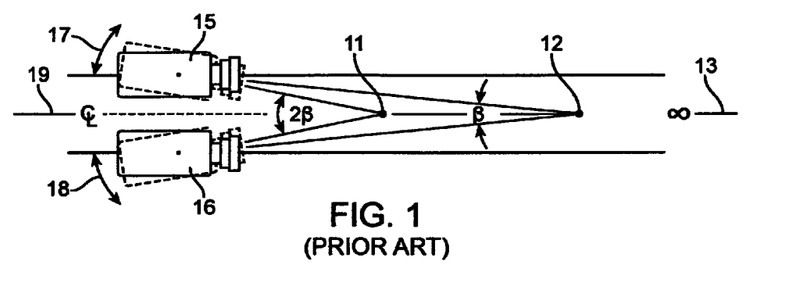
FIG. 1 shows prior art, in which a pair of cameras is made to converge on objects at various distances form the cameras by mechanical means such as rotation.

FIG. 1 shows an arrangement of dual cameras (or lenses) for 3D image capture, set between 2" and 2.5" apart with their optic axes parallel. This is the canonical arrangement, which we may designate here as Prior Art. In replicating human vision like two eyeballs, the two cameras 15 and 16 are made to rotate mechanically so that their optic axes converge on a particular object being viewed. The distance from the eyes (or the cameras) to the object in view is called the vergence distance. Normally this distance is also the focal length of the eyes or of the cameras. With reference to either an image plane or an object plane the potential difference between the two terms is called the disparity. Later we will discuss the importance of these terms.

In FIG. 1, the Prior Art, the two cameras 15 and 16 (or lenses) may be made to simply rotate. But there are other mechanical arrangements, such as lens displacements, beam-splitters and systems of moving prisms. Usually the optic axes are made to deviate from parallel, so that the optic axes will converge along a median axis 19 from a point at infinity 13, through an intermediate point 12, to a close-up point 11. The angle β, which we may designate the vergence angle, is zero at infinity and becomes less acute as the axes converge. This angle we will discuss later.

In the general case of two cameras or more, the cameras and the vergence points 11, 12 and 13 will, in general but not always, be coplanar.

Figure 2:
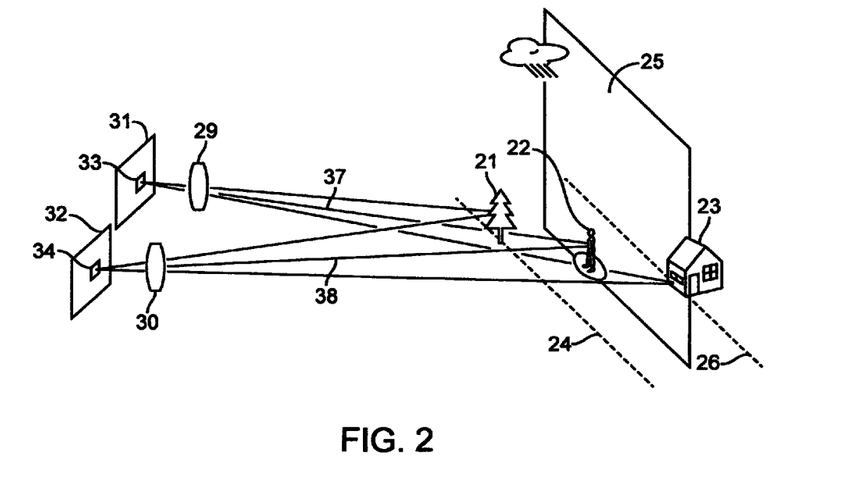
FIG. 2 shows a typical scene, such as may be taken by a photographer at a golf match, in which the elements of the scene are at different distances from the cameras

In FIG. 2 is shown a subject scene of the present invention, in which a pair of fixed detectors 31 and 32 image a scene through fixed lenses 29 and 30. In this invention the lenses and detectors do not move. Instead the images are made to appear to move, or are digitally warped, so that the vergence point can be moved into and out of the plane 25 either while the subject is being filmed or while the images are being displayed. Vergence control and adjustment are all achieved in software, which can be done both in image capture by the photographer and in image display by the viewer. In fact this can be done anywhere in the data stream.

By moving the vergence point digitally the camera system has no mechanical means of failure because there are no moving parts. Additional benefits are that through software vergence can be controlled continuously and instantly.

The illustration in FIG. 2 might be typical of a scene in which a photographer is taking a video of a golf match, where a golfer 22 may be at the center of a field of view 25, with a house 23 in the background with a tree 21 in the foreground. Here, a pair of principal rays 37 and 38 from the golfer are shown falling on the detectors at points 33 and 34. Shown is a certain depth of field with object planes 24 in front of and 26 behind the vergence plane 25. Within this depth of field all objects are brought into sharp focus on the detectors 33 and 34. However, the result of filming or photographing this scene is that, when displayed, the tree 21 will appear in front of the display screen and the house 23 behind. In other words the vergence plane 25 determines the apparent distance to all objects within the field of view.

For reasons we will discuss, unless the focal plane is the same as the vergence plane the resulting video could give a viewer great discomfort. As a rule of thumb this can occur when the disparity is more than plus or minus half a diopter. So the issue we address is—how can take away this disparity, how can we increase the viewer's comfort?

Figure 3:
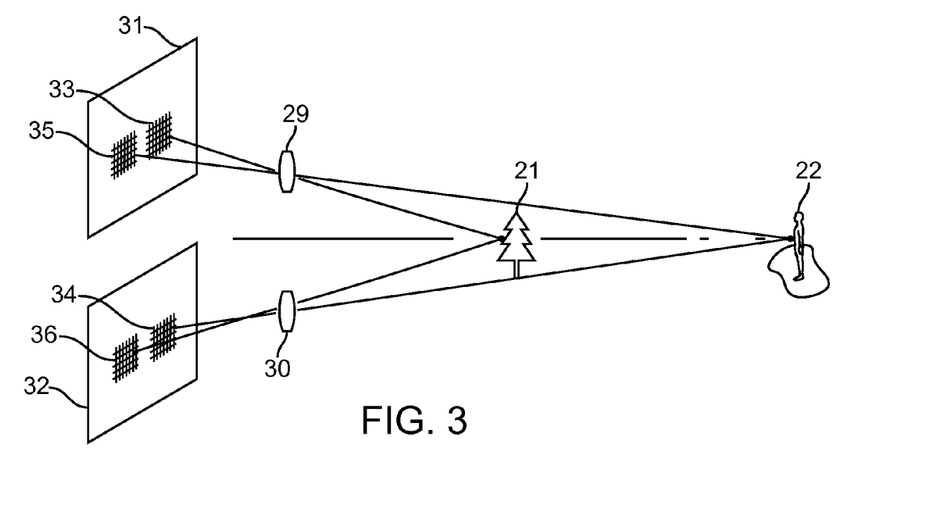
FIG. 3 is a sketch of how the elements of the scene, for example a golfer and a tree, fall as images onto two detecting surfaces

Referring now to FIG. 3, we look a little more closely at the positions of pixels 33 and 35 on one detector, and at the position of pixels 34 and 36 on the other, where the image of the golfer falls. Then we compare these with the sets of pixels 35 and 36 where the image of the tree 21 falls. We consider now how the vergence point can be moved by shifting the apparent pixel position from point 33 to 35 and from point 34 to 36, to bring the vergence point forward from the golfer to the tree.

In the present invention we approach this through the following steps, which have to do with speed and efficacy, reducing to a minimum computing time, allowing vergence changes within milliseconds:

The first step is primary alignment. By bringing the images from the two cameras manually into close correspondence we can reduce computing power later. We note that the cameras have seven degrees of freedom—focal length and zoom, x, y and z, and pitch, roll and yaw. Focal length and yaw (or vergence) in this instance are the most important to us. The alignment of x, y and z manually may be good enough to bring the two detectors onto almost identical points (0,0) on their local x-y planes, differing only by their global offsets a and −a on the z-axis in FIG. 4 and FIG. 5.

We note that in all the transforms below we use the local coordinates of the detectors (rather than the global coordinates discussed later for image mapping) for all transformations. That is, that when our alignments are carried out to a sufficient degree point $(x_i, y_i)$, of detector 31 will correspond (almost) exactly to point $(x_i, y_i)$ of detector 32.

The adjustments then apply to the focal length and zoom, pitch, roll and yaw. It may be convenient here to place the two images of a scene side by side on a display containing cross-hairs or fiducial marks. The roll can be adjusted manually by aligning a left and a right vertical image (say of a tree) against corresponding vertical lines on the screen. The vertical position (or pitch) can now be manually set against some common horizontal projection—such as a branch on the tree. These two actions will also define the yaw, or vergence, of the two cameras upon the tree.

The final (manual) adjustment applies to focal length and zoom. By adjusting two (or more) corresponding (widely separated) features the two images near or on the primary plane 25 may be made to appear the same size to the eye.

With proper alignment tools this process can (typically) be done in a few minutes We should now have the images lined up (by eye) to within a few pixels. For the next step, secondary alignment, we may use a typical feature-based approach. For feature selection, any of a number of edge detection algorithms can be used, depending on our purpose (e.g. J. Canny, "A Computational Approach to Edge Detection," *IEEE Transactions on Pattern Analysis and Machine Intelligence*, Vol. PAMI-8, No. 6, 1986, pp. 679-698). However, since we already know (by eye) which feature(s) we have chosen—such as the golfer 22—this process can be accomplished quite quickly.

The simplest way to line up the corresponding images such as those of the golfer 35 and 36 is with a Euclidean similarity transform, simply put:

$$X' = TX$$

Where X is a group of pixels representing the first image, X' is a similar group in the second image (using local coordinates). T is then the transformation matrix so that $$\begin{bmatrix} x'_1 & \ldots & x'_n \\ y'_1 & \ldots & y'_n \\ 1 & \ldots & 1 \end{bmatrix} = \begin{bmatrix} s\cos\alpha & s\sin\alpha & t_x \\ -s\sin\alpha & s\cos\alpha & t_y \\ 0 & 0 & 1 \end{bmatrix} \cdot \begin{bmatrix} x_1 & \ldots & x_n \\ y_1 & \ldots & y_n \\ 1 & \ldots & 1 \end{bmatrix}$$

where (in this case because of previous efforts in alignment) we assume that there is only a small difference in size $s=1+\epsilon$, a small angle $\alpha$ between the two images, and only small horizontal and vertical image displacements $t_x$ and $t_y$.

If we want to do a really fine alignment between the two images (realizing that because the images are taken from different perspectives the error function will only approach zero) we may use the following. (See Richard Szeliski, December 2006). We may consider the minimum of the sum of squares function $E_{SSD}(u)$ for individual (noted) features on detectors 31 and 32:

$$ESSD(u) = \sum_i [I_1(x_i + u) - I_0(x_i)]^2 = \sum_i (e_i)^2$$

Where $u=(u, v)$ is the feature displacement and $ei=I_1(x_i+u)-I_0(x_i)$ is the error function or feature displacement offset within the detecting areas ($I_0$ being the reference feature image and $I_1$ the subsequent sample).

We note also that the sum of squared differences function $E_{SSD}(u)$ above can be written as a Fourier transform:

$$\mathcal{F}\{ESSD(u)\} =$$

$$\mathcal{F}\left\{\sum_i [I_1(x_i+u) - I_0(x_i)]^2\right\} = \delta(f)\sum_i [I_1^2(x_i) - I_0^2(x_i)] - 2I_0(f)I_1^*(f)$$

In this way $E_{SSD}(u)$ can be computed by subtracting twice the correlation function from the sum of the energies of the two images. We may use this approach for correlating larger pixel areas because it is faster.

A corollary of this is that having lined up (say) two features (relatively far apart) on the two detectors we can now put the small angle $\alpha$ and the small difference in distance s between the two features into the transformation T above to bring the registration between the images to one pixel or less.

Having determined that the images are well-registered allows us to perform the following on-axis transform on both images simultaneously—in a general case as a homography or perspective transform. We know for on-axis transforms that we have to move the apparent images the same amount in opposite directions on their local x-axes in order to change vergence. (This, as may be seen on FIG. 4, is equivalent to rotating two cameras around their own vertical axes 17 and 18 in order to converge their optic axes on points 22 and 21)

This is also illustrated in FIG. 3, where in order to bring the vergence distance from the golfer 22 to the tree 21 there must be an apparent pixel shift (or transformation) from 35 to 33 on one frame, and from 34 to 36 on the other. In other words, these transformations must be done equally and in directions away from the median axis 19 to bring the vergence point closer to the detectors. (We discuss later the possibility of doing transformations off the median axis, where the transformations will be unequal.)

Figure 4:
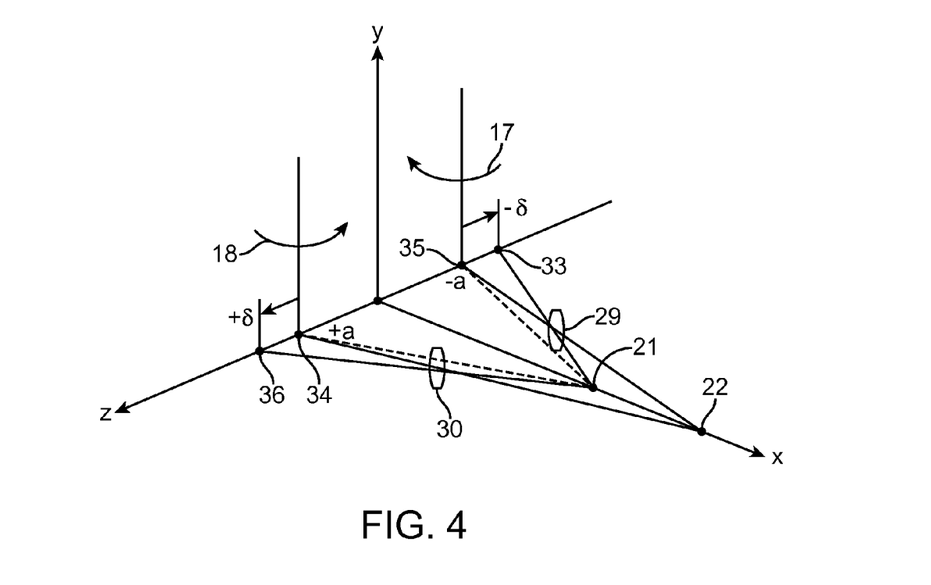
FIG. 4 shows how the cameras (in prior art) are turned on their individual axes as they converge on the first object, the golfer, or (as in the present invention) the pixels are correspondingly transformed on their detectors.

FIG. 4 now shows a geometrical model for these transformations, with equal small changes $\pm\delta$ of the apparent pixel positions along the common z-axis. This is equivalent to the convergent rotations 17 and 18 of the two cameras in FIG. 1.

In the simplest case, with well-correlated two-dimensional images on the detectors 31 and 32, and a small change in vergence, we can do a simple pixel shift along their local x-axes. Using homogeneous coordinates, with the small change $\pm\delta$, the transformation matrices will be $$T_1 = \begin{bmatrix} 1 & 0 & -\delta \\ 0 & 1 & 0 \\ 0 & 0 & 1 \end{bmatrix},$$

$$T_2 = \begin{bmatrix} 1 & 0 & \delta \\ 0 & 1 & 0 \\ 0 & 0 & 1 \end{bmatrix}$$

$T_1$ will be applied to create the apparent pixel shift 35 to 33 (on detector 31) and $T_2$ will be applied to create the (opposite) apparent pixel shift 34 to 36 (on detector 32). In this particular illustration the vergence plane will move forward and the image will recede as we increase $\delta$.

For larger shifts a projective (or perspective) transformation may be needed, to make foreground images larger and background smaller, or vice-versa. Other possible transformations include similarity, affine, Euclidean and non-Euclidean (for amending barrel and pin-cushion distortions). (For off-axis situations we will make a case below for skewed (or unequal) transformations.)

A transformation of particular interest is the inverse transformation $$X = T^{-1}X'$$

which can undo previous transformations. In the case above we can apply this to $T_1$ and $T_2$ since they are both square and of full rank. As we have noted this can be applied at the display end also, where a viewer will have control to alter vergence to the viewer's own comfort.

However, because we're dealing with real numbers $x_1$, $y_1$, etc. we do not need complex matrix multiplications (which may include determinants approaching zero). Instead we can simply invert individually the parameters of $T_1$ to give $T_1^{-1}$, for example: if $$T_1 = \begin{bmatrix} s\cos\alpha & s\sin\alpha & t_x \\ -s\sin\alpha & s\cos\alpha & t_y \\ 0 & 0 & 1 \end{bmatrix}$$

then $$T_1^{-1} = \begin{bmatrix} s^{-1}\sec\alpha & s^{-1}\csc\alpha & t_x^{-1} \\ -s^{-1}\csc\alpha & s^{-1}\sec\alpha & t_y^{-1} \\ 0 & 0 & 1 \end{bmatrix}$$

We may call this special case parametric inversion (rather than matrix inversion).

This leads to a relative simplicity of coding. If the parameters s, $\alpha$, $t_x$, and $t_y$ can be changed relatively easily at the source, then they can be changed relatively easily at the destination—and in fact at any point in between. For coding purposes this can be done unequally to the left and right images and quasi-randomly in timing. Knowing the timing and the code the recipient simply has to decode it, however with the necessity of perfect synchronicity to avoid jitter.

Figure 5:
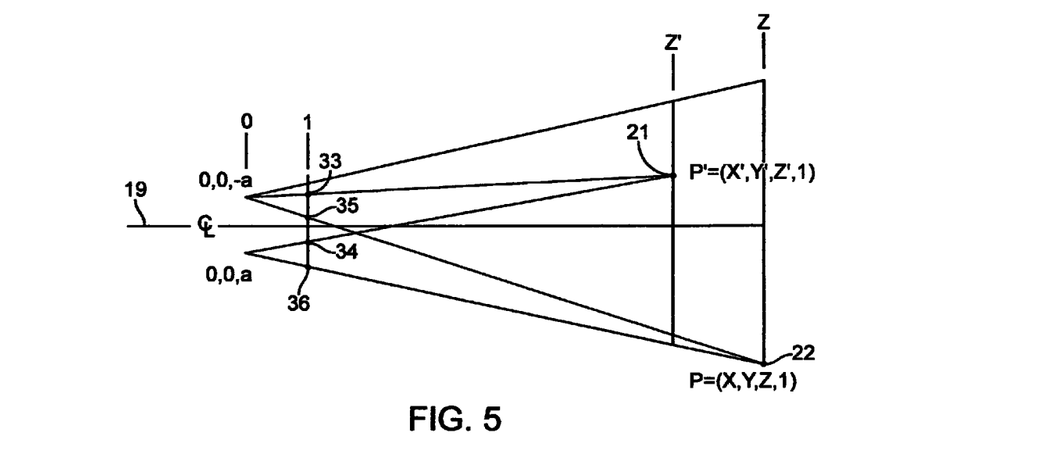
FIG. 5 is a plan view of the scene with notations for mathematical descriptions and calculations.
Figure 6:
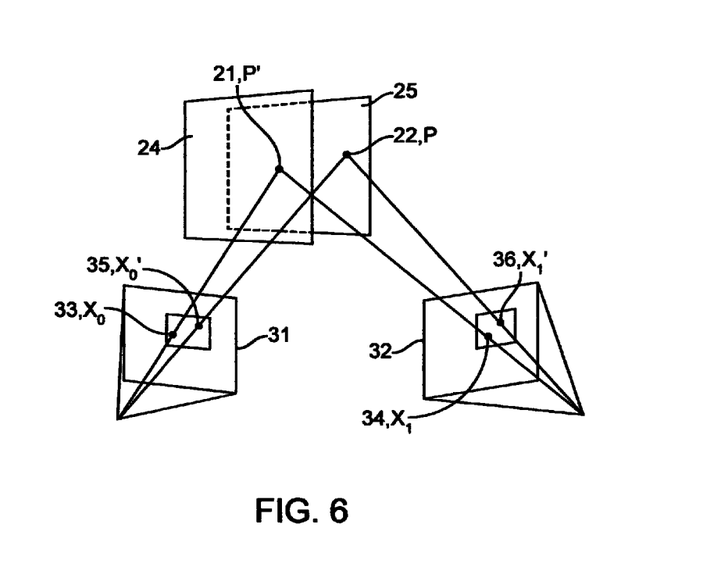
FIG. 6 is a pinhole model of two objects on a three-dimensional scene falling onto two two-dimensional detectors in order to create the elements of a three-dimensional representation.

Referring now to FIG. 5, using global homogeneous coordinates, we may now take up the case of off-axis transformations. As we can see from this figure we may wish to move the golfer 22 at point p=(X, Y, Z, 1) to the position of the tree 21 at point $p^1=(X^1, Y^1, Z^1, 1)$ when they are now both off-axis. This will skew the whole image towards the tree 21.

The golfer 22 in FIG. 5 will now be mapped to image coordinate 35, $X_0=(x_0, y_0, z_0, d_0)$, in frame 31 to appear as a Euclidean displacement $E_0$ $$X_0 = \begin{bmatrix} R_0 & t_0 \\ 0^T & 1 \end{bmatrix} p = E_0 p$$

with a perspective projection $P_0$ $$\overline{X}_0 \sim P_0 E_0 p$$

From this equation if we know the value of $d_0$ we can map it back to the coordinate p since $$p \sim P_0^{-1} E_0^{-1} \overline{X}_0$$

where $P_0^{-1}$ and $E_0^{-1}$ are the inverse transforms of $P_0$ and $E_0$, and then project it back to frame 32 with $$\overline{X}_1 \sim P_1 E_1 p = P_1 E_1 P_0^{-1} E_0^{-1} \overline{X}_0 = M_{10} \overline{X}_0$$

Which gives us point 36, $X_1=(x_1, y_1, z_1, d_1)$, in frame 32. If, in our case, we have a small angle α and if the feature, such as the golfer 22, is compact (i.e. not too deep) at the scene, we can simplify by considering the scene to be flat as it is imaged onto the frames 31 and 32. Therefore the last row of matrix $P_0$ can be replaced with an equation that maps points on the plane $d_0=0$, which reduces the last equation to $$\overline{X}_1 = H_{10} \overline{X}_0$$

That is, we can reduce the equation from a 4×4 homography matrix in 3D to a 3×3 projective matrix in 2D. In addition since the scene is not too close and the translation is small this can be reduced still further to a 2×3 affine matrix $A_{10}$ to substitute for $H_{10}$ in the equation above.

Similarly we can map the tree 21 in FIG. 5 from its position $\overline{X}_0^1 = (x_0^1, y_0^1, z_0^1, d_0^1)$ in frame 31, to its position $\overline{X}_1^1 = (x_1^1, y_1^1, z_1^1, d_1^1)$ in frame 32, with the simplifications that since the image maps flat on both frames $d_0^1$ and $d_1^1$ both equal zero.

Knowing the relative locations and orientations of the sets of images 33 to 35 and 34 to 36 a homography (or perspective) transform can be performed to bring the golfer 22 to the position of the tree 21 with the entire image skewed to follow.

To illustrate a simple calculation the following is an instance of a vergence program in Matlab, for a simple on-axis Euclidean transform, for a unique vergence point. In this case the parameters s, $t_x$, $t_y$ and α (alpha) are fairly small:

```
vergence.m
% load input images
I1=double(imread('left.jpg'));
[h1 w1 d1]=size(I1);
I2=double(imread('right.jpg'));
[h2 w2 d2]=size(I2);
% show input images and prompt for correspondences
figure; subplot(1,2,1); image(I1/255); axis image; hold on;
title('first input image');
[X1 Y1]=ginput2(2); % get two points from the user
subplot(1,2,2); image(I2/255); axis image; hold on;
title('second input image');
[X2 Y2]=ginput2(2); % get two points from the user
% estimate parameter vector (t)
Z=[X2' Y2'; Y2' -X2'; 1 1 0 0 ; 0 0 1 1]';
xp=[X1; Y1];
t=Z \ xp; % solve the linear system
a=t(1); %=s cos(alpha)
b=t(2); %=s sin(alpha)
tx=t(3);
ty=t(4);
% construct transformation matrix (T)
T=[a b tx; -b a ty; 0 0 1];
% warp incoming corners to determine the size of the output image (in to out)
cp=T*[1 1 w2 w2; 1 h2 1 h2; 1 1 1 1];
Xpr=min([cp(1,:) 0]):max([cp(1,:) w1]); % min x:max x
Ypr=min([cp(2,:) 0]):max([cp(2,:) h1]); % min y:max y
[Xp,Yp]=ndgrid(Xpr,Ypr);
[wp hp]=size(Yp); %=size(Yp)
% do backwards transform (from out to in)
X=T \ [Xp(:) Yp(:) ones(wp*hp,1)]'; % warp
% re-sample pixel values with bilinear interpolation
clear Ip;
xI=reshape(X(1,:),wp,hp)';
yI=reshape(X(2,:),wp,hp)';
Ip(:,:,1)=interp2(I2(:,:,1), xI, yI, '*bilinear'); % red
Ip(:,:,2)=interp2(I2(:,:,2), xI, yI, '*bilinear'); % green
Ip(:,:,3)=interp2(I2(:,:,3), xI, yI, '*bilinear'); % blue
% offset and copy original image into the warped image
offset=-round([min([cp(1,:) 0]) min([cp(2,:) 0])]);
Ip(1+offset(2):h1+offset(2),1+offset(1):w1+offset(1),:)=double(I1(1:h1,1:w1,:));
% show the result
figure; image(Ip/255); axis image;
title('vergence image');
```

We can introduce into this program a function to change the angle β (beta) from FIG. 1 externally.

As an added benefit it can be seen above that the program also allows compensation for chromatic aberration as the angle β changes.

The angle β deserves further comment in that it may be more convenient in our fixed solid solid-state systems to physically align the optics to some intermediate angle so that the pixel changes are not too far off-axis. We can do this by picking a point 12 in which the angle β is intermediate between 0° (at infinity 13) and 2β (close up 11). This will reduce computer processing software and time by minimizing distortions.

Figure 7:
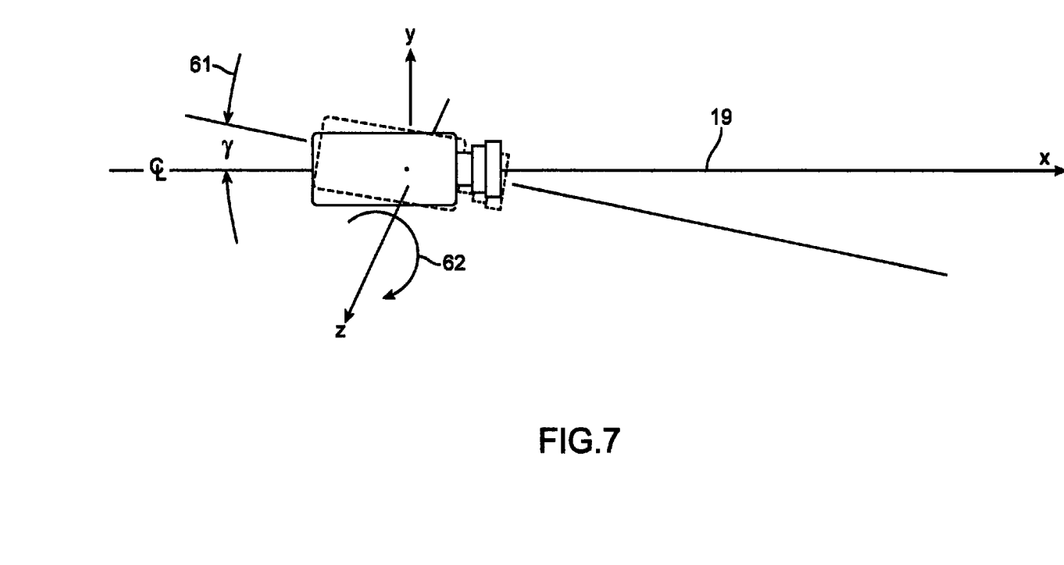
FIG. 7 is a side view of the two cameras showing a divergence of one of the cameras due to pitch.

We refer now to FIG. 7, which is a horizontal view of the two cameras 15, 16 in FIG. 1. This shows the potential for vertical disparity as a result of a rotation 61 around the z-axis 62 of one of the cameras relative to the other, which we previously referred to as pitch. This disparity increases as the distance to the object along the x-axis increases. This disparity can be very uncomfortable to a viewer, as can be easily verified by simply tilting the glasses of a person reading these lines. This can be amended with a permanent fix in the apparent of the pixels in one of the cameras in the transformation above should the detectors not, at some point, be perfectly coplanar on the x-z plane.

The fix referred to will be $t_y^1 = f \tan \gamma$ added to $t_y$ in the transformation, where f is the back focal length and γ is the pitch angle 61 in FIG. 7.

This fix, which may be achieved automatically in an alignment algorithm as above, is very useful if the cameras are dropped, warped by heat, or dislocated in some other way. It should not need to be altered otherwise.

Figure 8:
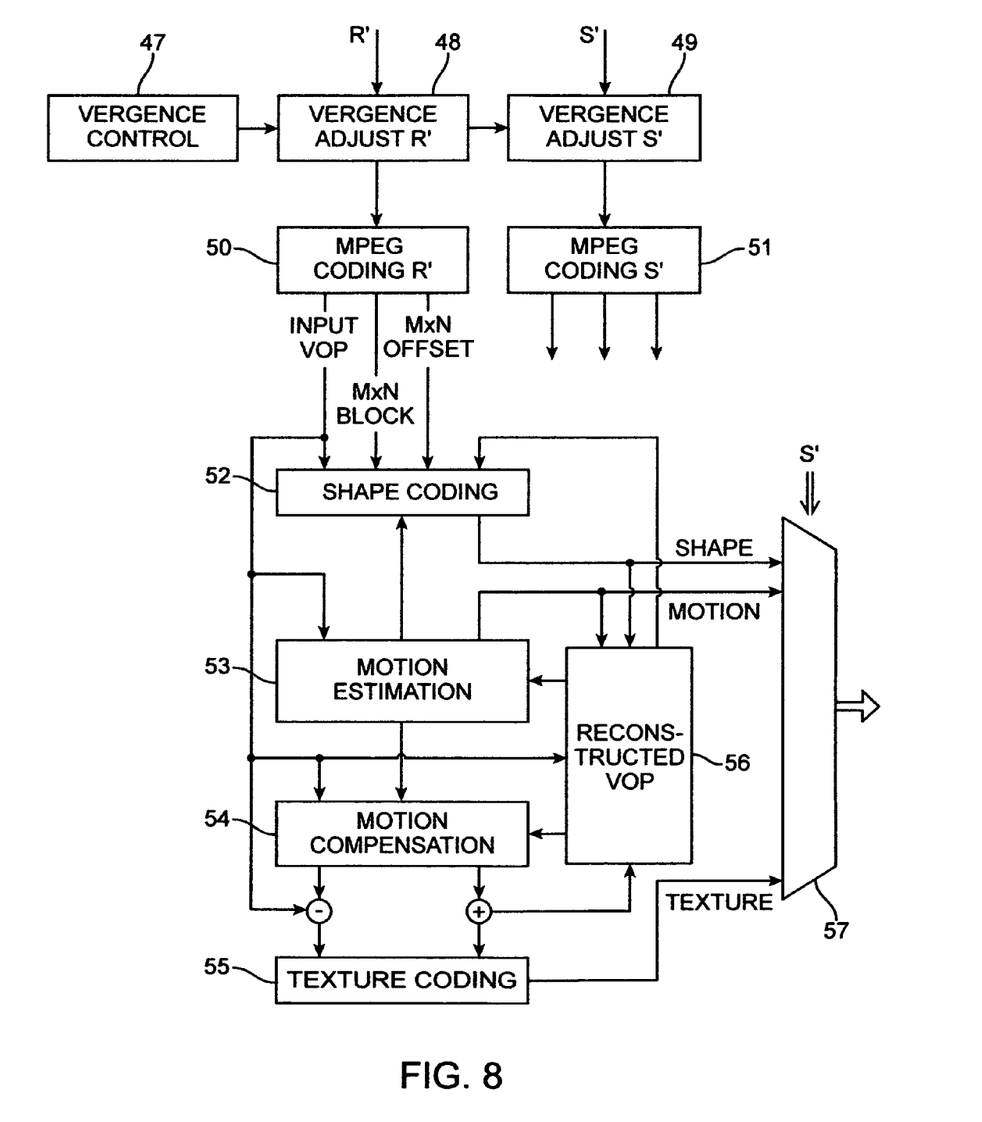
FIG. 8 shows how the two data streams are (i) controlled for vergence and (ii) compressed for transmission

FIG. 8 shows process steps for image management. Vergence control is achieved externally 47 by adjusting the vergence parameters simultaneously in blocks 48 and 49 (which may either be specialized chips or part of the MPEG coding electronics). Parallel MPEG-4 coder blocks 50 and 51 synchronously compress the reference and sample data streams from 48 and 49. (This will conform to standards such as H.264/MPEG-4 AVC, depending on the type and quality of transmission required.) The data streams are further processed for shape coding 52, motion estimation 53, motion compensation 54, and texture coding 55, for reduction 56 into single (or parallel) data streams for transmission 57 to display or storage in MPEG-4 format.

Figure 9:
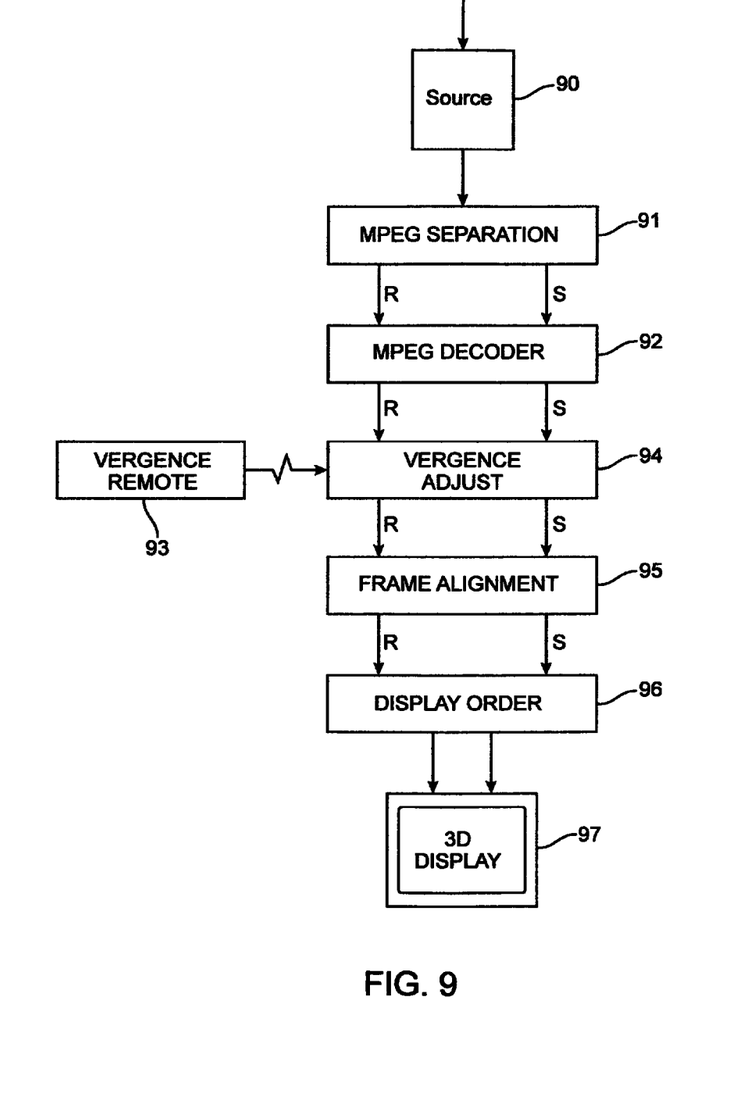
FIG. 9 shows a display driver with the management of two incoming data streams for creating 3D images on a display with vergence control.

(Note: We are following MPEG-4, which is a collection of methods defining compression of audio and visual (AV) digital data introduced in 1998. It was designated a standard for a group of audio and video coding formats and related technology agreed upon by the ISO/IEC Moving Picture Experts Group (MPEG) under the formal standard ISO/IEC 14496. Uses of MPEG-4 include compression of AV data for web (streaming media) and CD distribution voice (telephone, videophone) and broadcast television applications). We could easily use any other protocol suitable for transferring high-speed data over airwaves or land-lines FIG. 9 shows the final output to the display. This can be live (in virtually real time) or from storage 90. A first block 91 represents the separation of data streams into left and right, if previously combined. A second block 92 is the MPEG-4 decoder, which decompresses the left and right frames for display. A controller 93 (which may be either attached or remote) controls the vergence adjustment electronics (which may be a specialized chip) 94. A block 95 is for accurate alignment of the left and right frames for producing (good) 3D on the particular type of display. (This may have to be adjusted for individual displays). 96 is the driver for the display 97 itself. In the case of TVs many of these blocks are provided by the display manufacturer.

While the invention has been described and illustrated (in general) as a dual imaging device in which the vergence distance to objects of interest is mutable in software, and in which, the vergence distance to screen images is mutable by the viewer, in fact to those skilled in the art, the techniques of this invention can be understood and used as tools for creating and perfecting three-dimensional imaging tools with variable vergence throughout the electro-magnetic spectrum and beyond. It may be understood that although specific terms are employed, they are used in a generic and descriptive sense and must not be construed as limiting. The scope of the invention is set out in the appended claims.

What is herein claimed is:

1. A method operative on a computer for altering vergence points for multiple detectors in real time, the method comprising:
    a pre-alignment step of converging the detectors on a chosen intermediate point by mechanical means, said pre-alignment step including a focal length adjustment of all said detectors;
    a secondary alignment step whereby image features from said detectors are identified and used in a transformation to bring all images into substantially equal orientation and size;
    a fine alignment step of aligning said images through at least one of a sum of differences squared algorithm or a Fourier transform algorithm;
    a vergence step applied in correlated steps to move apparent vergence points evenly to a location nearer to or further away from said detectors;
    each said detector image contains image pixels $x_i$ and $y_i$, thereby forming respective image matrices $$X = \begin{bmatrix} x_1 & \dots & x_n \\ y_1 & \dots & y_n \\ 1 & \dots & 1 \end{bmatrix}$$

said transformation being at least one of:
    multiplication of said X by the matrix $$\begin{bmatrix} s\cos\alpha & s\sin\alpha & t_x \\ -s\sin\alpha & s\cos\alpha & t_y \\ 0 & 0 & 1 \end{bmatrix}$$

where $s=1\pm\epsilon$ and $\alpha$ is the small angle between the two images;
    multiplication of said X by the corresponding matrices $$\begin{bmatrix} 1 & 0 & -\delta \\ 0 & 1 & 0 \\ 0 & 0 & 1 \end{bmatrix}$$

and $$\begin{bmatrix} 1 & 0 & \delta \\ 0 & 1 & 0 \\ 0 & 0 & 1 \end{bmatrix}$$

when image pixels are offset by $\delta$ from either side of a desired vergence image location.

2. The method as in claim 1 wherein said vergence step is performed after acquisition of an image from said detector, during said secondary alignment step, or during said fine alignment step.

3. The method as in claim 1 wherein said vergence step is performed in real-time.

4. The method as in claim 1 wherein the number of detectors is two or more.

5. The method as in claim 1 wherein an inverse matrix operation is performed on a previous transformations in real-time through parametric inversion, said inverse matrix operation restoring an original value from the operation of said previous transformation.

6. The method as in claim 5 wherein data streams are encoded through transformation at different time intervals and decoded synchronously using a parametric inversion.

7. The method as in claim 1 wherein said transformations are performed on an off-axis image feature.

8. The method as in claim 1 wherein said transformations are at least one of: similarity, affine, Euclidean, or non-Euclidean.

9. The method as in claim 8 wherein features are made more prominent or less prominent by said transformation.

10. The method as in claim 8 wherein image disparities are reduced or increased by said transformations.

11. The method as in claim 1 wherein said mechanical pre-alignment step is performed electronically during said fine alignment step.

12. An image processor altering vergence points from multiple detectors, the image processor operative in real time, the image processor:
- converging the detectors on a chosen intermediate point by mechanical means and performing a focal length adjustment of all said detectors;
- the image processor identifying image features from said detectors, said image features transformed to bring all images into substantially equal orientation and size;
- the image processor aligning said images through at least one of a sum of differences squared algorithm or a Fourier transform algorithm;
- the image processor moving apparent vergence points evenly to a location nearer to or further away from said detectors;
- each said detector image contains image pixels $x_i$ and $y_i$, thereby forming respective image matrices $$X = \begin{bmatrix} x_1 & \ldots & x_n \\ y_1 & \ldots & y_n \\ 1 & \ldots & 1 \end{bmatrix}$$

said transformation being at least one of:
multiplication of said X by the matrix $$\begin{bmatrix} s\cos\alpha & s\sin\alpha & t_x \\ -s\sin\alpha & s\cos\alpha & t_y \\ 0 & 0 & 1 \end{bmatrix}$$

where $s=1\pm\epsilon$ and $\alpha$ is the small angle between the two images; multiplication of said X by the corresponding matrices $$\begin{bmatrix} 1 & 0 & -\delta \\ 0 & 1 & 0 \\ 0 & 0 & 1 \end{bmatrix}$$

and $$\begin{bmatrix} 1 & 0 & \delta \\ 0 & 1 & 0 \\ 0 & 0 & 1 \end{bmatrix}$$

when image pixels are offset by $\delta$ from either side of a desired vergence image location.

13. The image processor of claim 12 where said image processor moving apparent vergence points is performed either after acquisition of images from said detectors or when said image processor is aligning said images.

14. The image processor of claim 12 where moving apparent vergence points is performed by said image processor in real-time.

15. The image processor of claim 12 where the number of said multiple detectors is two.

16. The image processor of claim 12 where said image processor also performs an inverse matrix operation on one or more previous transformations in real-time through parametric inversion, said inverse matrix operation restoring an original value from the operation of said previous transformation.

17. The image processor of claim 16 where said detectors generate data streams which are encoded through transformation at different time intervals and decoded synchronously using said parametric inversion.

18. The image processor of claim 12 where said transformations are performed on an image feature which is off-axis.

19. The image processor of claim 12 where said transformation is at least one of a similarity transformation, an affine transformation, a Euclidean transformation, or a non-Euclidiean transformation.

20. The image processor of claim 12 where said transformation reduces or increases an image disparity.

* * * * *